United States Patent [19]
West

[11] Patent Number: 6,124,589
[45] Date of Patent: Sep. 26, 2000

[54] VIRTUAL MASK ENCODER

[76] Inventor: Donald Lee West, 3060 Pine Ridge Rd., Winchester, Ky. 40391

[21] Appl. No.: 09/093,674

[22] Filed: Jun. 8, 1998

Related U.S. Application Data

[60] Provisional application No. 60/049,698, Jun. 16, 1997.

[51] Int. Cl.[7] .............................. G01D 5/347; G01D 5/36
[52] U.S. Cl. .................................. 250/231.14; 250/237 G
[58] Field of Search ........................ 250/231.13, 231.14, 250/231.16, 231.18, 237 G; 356/373, 374, 375, 354, 355, 356, 358

[56] References Cited

U.S. PATENT DOCUMENTS

| | | |
|---|---|---|
| 3,496,364 | 2/1970 | Foskett . |
| 3,524,067 | 8/1970 | West . |
| 4,180,703 | 12/1979 | Cialone . |
| 5,017,777 | 5/1991 | Ishizuka et al. ................... 250/231.16 |
| 5,036,192 | 7/1991 | Ishizuka et al. ................... 250/231.16 |
| 5,101,102 | 3/1992 | Nishimura et al. ................ 250/231.16 |
| 5,336,884 | 8/1994 | Khoshnerisan et al. ........... 250/231.18 |
| 5,451,776 | 9/1995 | Kolloff et al. ..................... 250/231.18 |

OTHER PUBLICATIONS

BEI Motions Systems Company's "Optical Encoder Design Guide", Sep. 1990.

*Primary Examiner*—John R. Lee
*Attorney, Agent, or Firm*—Kenneth F. Pearce

[57] ABSTRACT

An encoder for encoding light moving through a grating having alternating opaque and translucent or transparent divisions thereon. Inclusion of a gradient index lens reflector into the encoder eliminates the physical mask required for resolution of finely drawn opaque lines of line pairs.

38 Claims, 2 Drawing Sheets

VIRTUAL MASK ENCODER

This Application for Letters Patent relates back to Provisional Application, Ser. No. 60/049,698, West, Donald, filed on Jun. 16, 1997 which was entitled—Virtual Mask Position Sensor—on the date the Provisional Application was filed.

BACKGROUND OF THE INVENTION

1. Field of the Invention

An encoder for encoding light moving in the visible or infrared spectrums. In accordance with the present invention, the amount of light transmitted through a grating which has alternating opaque and translucent or transparent divisions thereon can be discerned. Depending on the particular embodiment selected, the present encoder can detect both motion and direction, as well as render a reference. The present invention is easily adapted for use with linear, arced, or any other type of grating. Tedious manual alignment of the grating with respect to other elements of the encoder can be eliminated. Within the scope of the present unity of invention, inclusion of the gradient index lens reflector eliminates the physical mask required which has previously been mandated for precision sensing of light transmitted through gratings. Further, the present encoder has been found to eliminate or minimize spherical aberration commonplace in the prior art.

2. Description of the Previous Art a) U.S. Pat. No. 3,524,067-West discloses a compact line grating position sensing device. In a first embodiment, West requires at least one traditional plano-convex lens while in another and more preferred embodiment, a pair of conventional planar convex lens must be utilized to focus the light passing through the grating. West teaches that traditional glass lens having curved faces are required to focus light, before his invention can be practiced. Moreover, U.S. Pat. No. 3,534,067 is limited to position sensing.

b) U.S. Pat. No. 3,496,364-Foskett discloses a linear encoder having a fringe pattern produced by optical imaging. In accordance with Foskett, the combination of a traditional convex lens, a right angle prism and a pentaprism is required to bend the beam of light to the required parameters, before the invention can be practiced. Due to the design of U.S. Pat. No. 3,496,364, not only is it cumbersome to practice, but it is virtually impossible to keep its components in proper working alignment in an industrial setting. Thus, it appears any attempt to provide perpetual detection of any precisely and minutely refined motion or direction, if possible at all, is at best short-lived.

c) U.S. Pat. No. 4,180,703-Cialone, et. al., discloses a bi-directional, self-imaging grating detection apparatus which is especially useful for ink jet printers. Cialone's grating mandates two sets of opaque lines thereon, with one set being laterally offset from the other, and preferably, at an angle of 45 degrees relative to the other set. Importantly, U.S. Pat. No. 4,180,703 directs its source-detectors be aligned specifically with each separate set of opaque lines, on the grating, as well as its preferably concave reflective surface, for both motion and direction to be detected. Additionally, Cialone also requires the distance form its reflective spherical segment surface to the grating be equal to the radius of curvature of the spherical segment surface.

d) Based upon the information available to applicant, the current state-of-the-art technology for incremental encoders typically utilizes various combinations of housing assemblies, light sources, code disks, physical masks, photodetector assemblies and electronics boards. Please see, BEI Motions Systems Company's "Optical Design Guide" (copy to be included with applicant's 37 C.F.R. Section 1.56 Disclosure Statement). Although identical scientific precepts are applied to the functionality of either rotary or linear encoders, it appears rotary encoders dominate current usage. Examples of industries presently employing such encoders include machine control, process control, robotics, food processing and laboratory instrumentation, to name a few.

SUMMARY OF THE INVENTION

The present unity of invention includes rotary and linear encoders. In particular, those encoders capable of sensing the amount of light transmitted through gratings which thereafter send data to a decoder. In the art, gratings include numerous finely divided opaque lines per millimeter. Importantly, those skilled in the art further comprehend the more opaque lines per millimeter the more arduous it becomes for the encoder to sense the quantity of light passing between the opaque lines.

Current use, especially of rotary encoders, requires a physical mask near the arced grating, before the amount of light passing between the opaque lines can be resolved. It has unexpectedly been found that including a gradient index lens reflector into the present encoder eliminates the necessity of the physical mask. Additionally, it has also unexpectedly been discovered that the inclusion of the gradient index lens reflector into the present invention minimizes spherical aberration commonplace in the prior art which has traditionally relied upon variations of conventional glass lenses. Moreover, depending upon the particular embodiment practiced, the current encoder can detect motion and direction, as well as render a reference. Those skilled in the art will appreciate the present invention fills the long felt but previously unfilled needs of simple construction and elimination of the physical mask required by the prior art. This structural simplicity magnifies both the sensitivity and durability of encoders, within the scope of the present invention.

An object of the present invention is to provide an encoder which is compact in size and capable of sustaining vibrations associated with industrial usage.

Another object of the present invention is to provide an encoder capable of sensing the light which passes through an arced, linear or any other type of grating.

Yet another object of the present invention is to provide an encoder which includes a gradient index lens reflector.

Still yet another object of the present invention is to provide a gradient index lens reflector which can focus a corresponding image in a plane outside the gradient lens reflector.

Yet another object of the present invention is to provide a gradient index lens reflector where its reflective surface is in spacial relation to the gradient index lens reflector.

It is another object of the present invention to provide a gradient index lens reflector where its reflective surface is attached to the lens.

It is yet another object of the present invention to provide an encoder of inexpensive construction.

It is still another object of the present invention to provide an encoder compatible with presently available fiber optics.

Yet still another object of the present invention is to provide an encoder which can generate quadrature signals.

It is still another object of the present invention to eliminate or reduce spherical aberrations associated with previous encoders.

Still another object of the present invention is to provide an encoder which eliminates the physical mask currently required by the art.

Yet another object of the present invention is to provide an encoder including a gradient index lens reflector capable of reflecting a corresponding image relative to the ingressing image wherein the corresponding image acts as a mask thereby improving the sensitivity of the encoder.

It is still another object of the present invention to provide an encoder where the corresponding and ingressing images are proximal regardless of the movement of the grating.

It is yet another object of the present invention to provide an encoder which can be linked by fiber optics to remote locations which would otherwise be hazardous to the operator's health, e.g., explosive or toxic environments.

As used herein, "ingressing image" shall mean the image focused within the gradient index lens reflector due to incoming light received by the gradient index lens reflector.

As used herein, "corresponding image" shall mean the egressing image reflected by the gradient index lens reflector and focused either on the planar surface of the gradient index lens or in a focal plane outside the gradient index lens reflector.

As used herein, "emitting image" shall mean the image perceived by the sensor after the light associated with the corresponding image has passed through the grating.

A first embodiment of the present invention can be described as an encoder, comprising: a positioner for a grating, a light for illuminating an area of the grating, a gradient index lens aligned with the grating for focusing an ingressing image on a reflector for reflecting a corresponding image proximate to the grating, a sensor aligned with the reflector for sensing an emitting image from the grating, and a driver for moving the grating.

Another embodiment of the present invention can be described as an encoder, comprising: a positioner for a grating, a light for illuminating first and second areas of the grating, a gradient index lens aligned with the grating for focusing first and second ingressing images on a reflector for reflecting first and second corresponding images proximate to the grating, first and second sensors aligned with the reflector for sensing first and second emitting images from the grating, and a driver for moving the grating.

Other personifications of the present invention can include additional lights, reflectors and sensors. It is the novel and unique interaction of these simple elements which creates embodiments within the ambit of the present unity of invention. Pursuant to Title 35 of the United States Code, descriptions of preferred embodiments follow. However, it is to be understood that the best mode descriptions do not limit the scope of the present invention. The breadth of the present invention is identified in the claims appended hereto.

DESCRIPTION OF THE PREFERRED EMBODIMENTS

Figure 1:
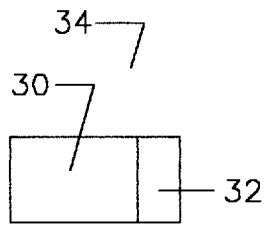
FIG. 1 is a side view of the gradient index lens reflector.

Although the disclosure hereof is detailed to enable those skilled in the art to practice the invention, the embodiments published herein merely exemplify the present invention which can be practiced in other specific structures.

As previously disclosed, embodiments of the present encoder eliminate the necessity of the physical mask. Thus, the encoder can operate with any type of grating having alternating opaque and transparent or translucent divisions thereon. Additionally, present embodiments are compatible with the decoders, computer programs, etcetera, currently available in the industry.

Although the present encoder can function by utilizing any type of light, for example, incandescent light, it is readily adapted for use with current state-of-the-art fiber optics. This unique feature provides for remote control from distances of millimeters to many kilometers. In a similar vein, even though the present invention is operable, at what is known in the art, as a multiplicity of monochromatic wavelengths, easily available Light Emitting Diodes and gradient index lens are already manufactured to function at wavelengths of 630, 780, 830, 1060, 1300 and 1560 nanometers. Such Light Emitting Diodes and gradient index lens of those preexisting wavelengths are readily adaptable with the present encoder.

For both simplicity of disclosure and implementation, in the embodiments illustrated in the drawings, a single light is utilized regardless of the number of sensors included with the encoder. At the same time, it is to be understood that an encoder utilizing multiple lights could accomplish identical results.

By incorporating a gradient index lens reflector into the current encoder, sensitivity of the sensor to the emitting image is vastly improved over the prior art, i.e., more line pairs can be included on the grating, without altering the characterics of the sensor. Those skilled in the art recognize a line pair as the combination of one opaque and one transparent or translucent line on the grating. By way of reference, it has been determined that the present encoder incorporating a 2.0 millimeter gradient index lens reflector has a resolving capability of 160 line pairs per millimeter at the center and 30 line pairs per millimeter at 0.8 R. And when utilizing a gradient index lens reflector having a diameter smaller than 2.0, higher resolutions of 400 line pairs per millimeter at the center and 150 line pairs at 0.8 can be achieved. Various embodiments of Applicant's gradient index lens reflector are disclosed in greater detail in Applicant's U.S. Pat. No. 5,995,294 entitled "Gradient Index Lens Reflector". Various embodiments of Applicant's gradient index lens reflector are disclosed in greater detail in Applicant's currently filed co-pending Application for Letters Patent entitled "Gradient Index Lens Reflector." By reference, descriptions of the embodiments of gradient index lens reflectors contained in Applicant's co-pending Application entitled "Gradient Index Lens Reflector" are incorporated herein.

As shown in FIG. 1, reflector (32) is attached to the gradient index lens (30) of encoder, but reflector (32) could also be positioned within or adjacent to gradient index lens (30). In this embodiment, gradient index lens (30) is provided with a pitch of 0.25, but a pitch of 0.75 or any other pitch capable of focusing the corresponding image is within the ambit of this invention. Specifications of this particular gradient index lens reflector (34) include a length of 6.36 millimeters and a diameter of 2.0 millimeters. However, it has been determined the encoder can also function with a gradient index lens reflector having a length and diameter of as much as 8.0 and 3.0 millimeters, respectively. Importantly, a gradient index lens of any size which can function in accordance with the optical parameters disclosed herein is adaptable to the present invention.

Figure 2:
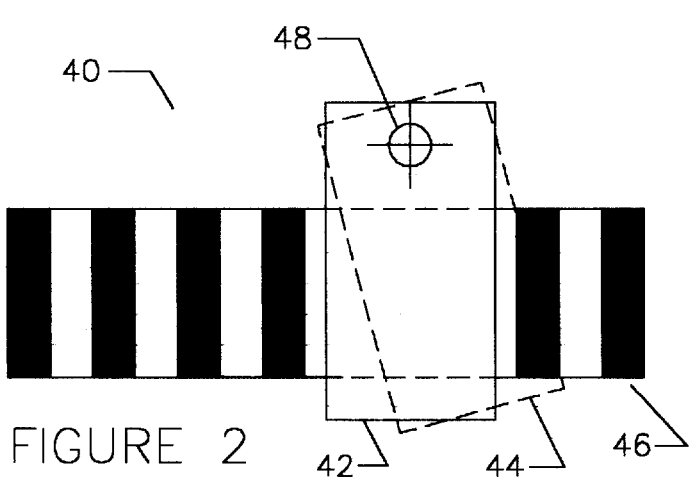
FIG. 2 is frontal view of a linear encoder and a grating.
Figure 3:
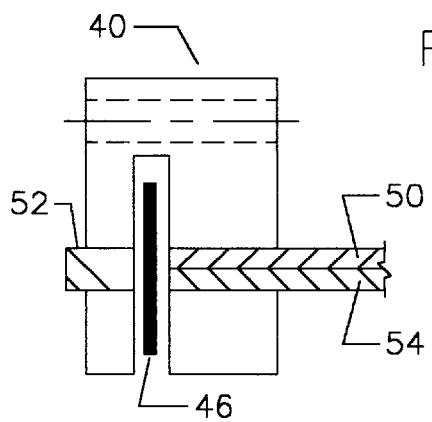
FIG. 3 is a side view of a linear encoder.

Turning now to FIGS. 2 and 3, frontal and side views of a linear embodiment of the present encoder (40) are shown. Positioner (42) is provided with arm (44) which can pivot about hinge (48) and angle grating (46). Arm (22), hinge (48) and positioner (42) can be manufactured from any material suitable for positioning grating (46). Further, positioner (42) can be constructed to any preselected dimensions compatible with the scope of the present invention.

As best seen in FIG. 3, light (50) is aligned with grating (46) and gradient index lens reflector (52) which is further aligned with sensor (54). When incorporating a second sensor (not shown), those skilled in the art understand both motion and direction of the grating can be encoded. Very importantly, it has been discovered, when adding the second sensor proximate to first sensor (54) while simultaneously angling grating (46) with arm (44) quadrature signals are generated. Furthermore, if a third sensor (not shown) is included with the present invention, a reference is also formed. Further still, in accordance with this embodiment, it has been determined the sensitivity of linear encoders is limited only by the construction of the grating, the resultant size restraints the positioner and the previously identified parameters for the gradient index lens reflector.

Figure 4:
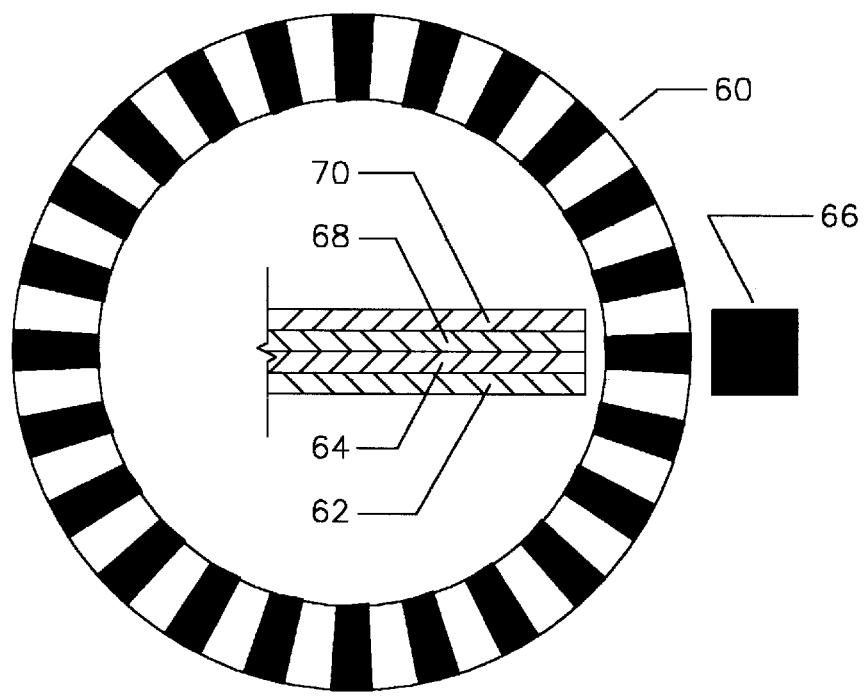
FIG. 4 is a top view of selected elements of a rotary encoder.

Selected elements for an embodiment of the present encoder utilizing an arced grating are disclosed in FIG. 4. On a first side of arced grating (60) is light (62) and sensor (64) while gradient index lens reflector (66) is positioned on an opposite side of grating (60). Whether arced or rotary, within the boundaries of the size of encoder selected for practice of the invention, grating (60) can be moved by any driver (not shown) operable in conjunction with the encoder. Thus, the dimensions of the rotary encoder are limited only by the optical parameters disclosed herein. By way of illustration for those skilled in the art, it has been determined that grating (60) can range from about a 7.5 millimeter R to as large a radius as is congruous with structure of the arched or rotary encoder.

As with the previously disclosed linear embodiments, by incorporating second sensor (68), both motion and direction of grating (60) can be encoded. And by angling grating (60), in a manner acceptable in the art, quadrature signals can be generated. Including third sensor (70) also provides a reference.

Those skilled in the art will discern, the functionality of the present encoder remains the same regardless of the number of sensors, gradient index lens reflectors or lights utilized. For further ease in understanding, whether linear or rotary, the dynamics of an encoder including one sensor are set forth in FIGS. 5 and 6. And by way of illustration, grating (80) is moved by driver (not shown) in the direction of arrow A, but depending upon the type of grating utilized in practicing the invention, reciprocal motion in the opposite direction is also possible.

In this specific embodiment, light (82) and sensor (84) are positioned on a first side of grating (80). Light (82) and sensor (84) are connected with decoder (not shown) and light source (not shown) by any acceptable manner within the art, e.g., fiber optics. Gradient index lens reflector (86) is positioned on an opposite side of grating (80). Ingressing area (88) and egressing area (90) are proximate each other on grating (80). Egressing area (90) is also representative of corresponding image (94), when it falls on grating (80). However, corresponding image (94) can coincide with planar surface (98) of gradient index lens reflector (86) or on a focal plane between planar surface (98) and grating (80). As shown, corresponding image (94) is inverted relative to vertical ingressing image focused on or about reflective surface (92) of gradient index lens reflector (86). Emitting image (not shown) exists between grating (80) and sensor (84).

Figure 5:
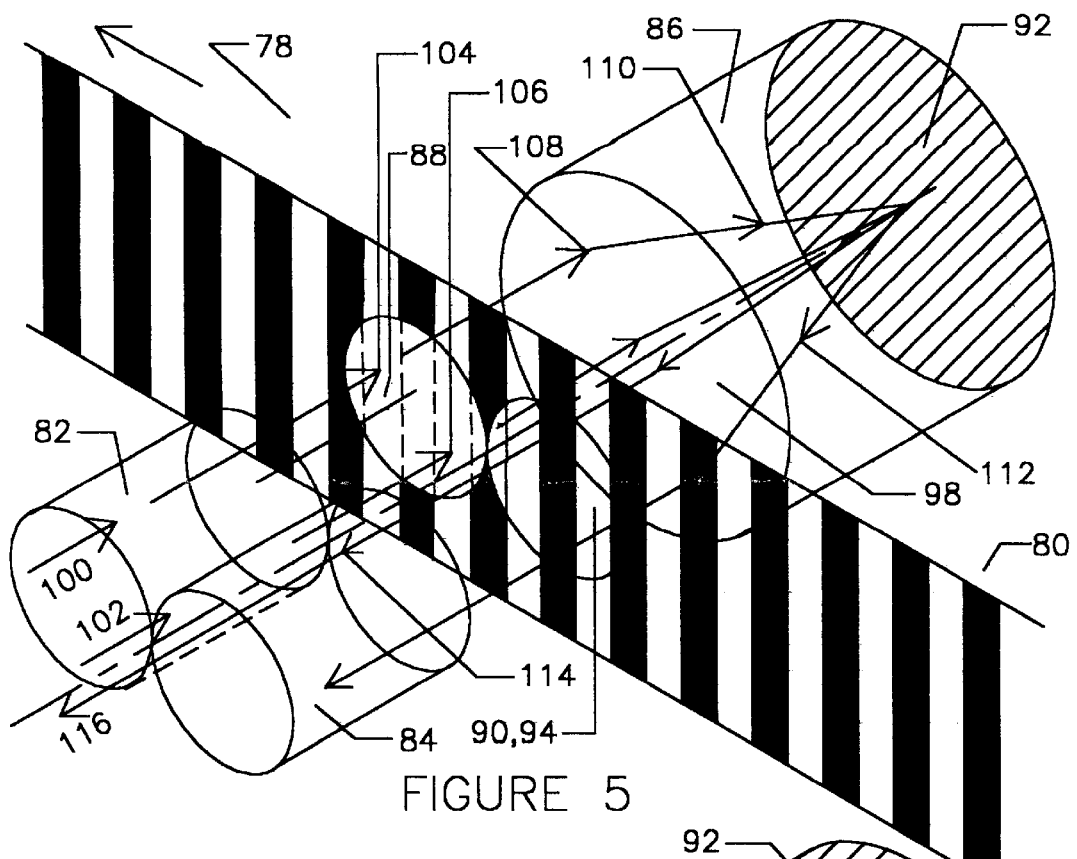
FIG. 5 is an illustration of the movement of light through the encoder.
Figure 6:
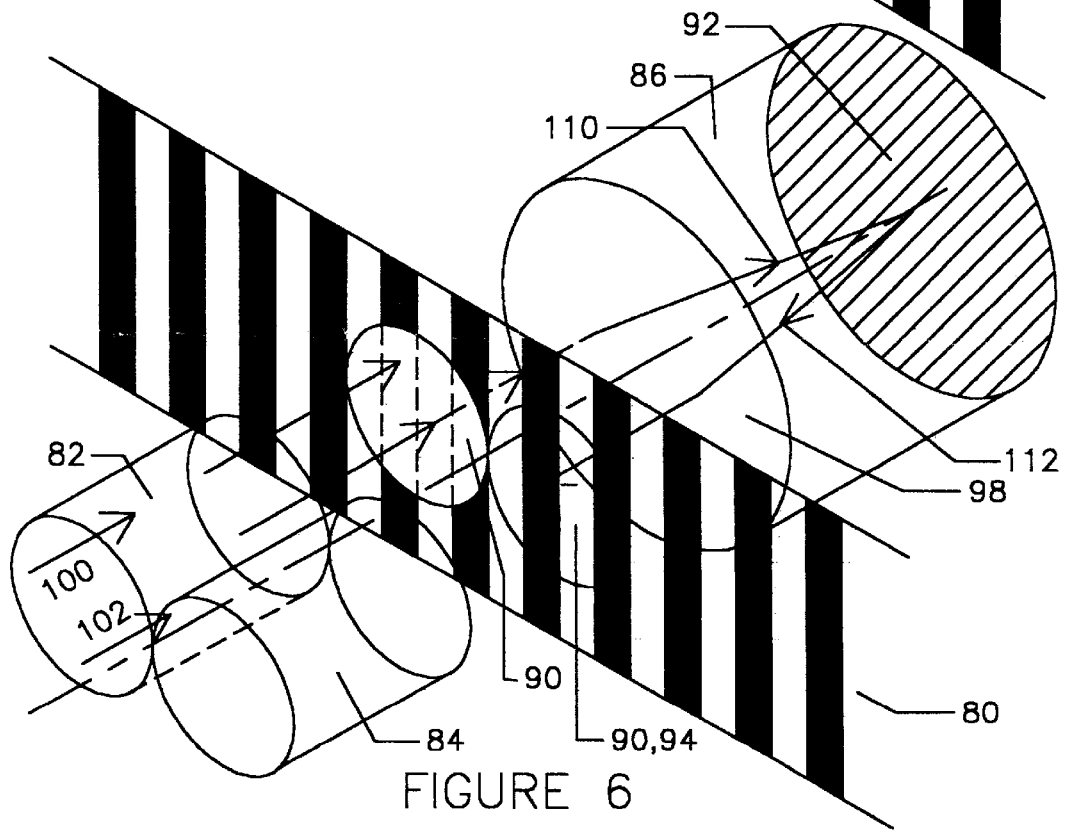
FIG. 6 is an illustration of the nonmovement of light through the encoder.

With reference to FIGS. 5 and 6, the pathway of light travelling through encoders, within the unity of the present invention, is set forth. In FIG. 5, as represented by arrows 100, 102, 110, 112, 114 and 116, the passage of light into and through the encoder is disclosed. And in FIG. 6, as represented by arrows, 100, 102, 110 and 112, it can be seen that the passage of light is obstructed from entering sensor (84). Thus, depending upon the motion of grating (80) and the quantity of line pairs assimilated on grating (80), the pathway of reflected light out of gradient index lens reflector (86) will be either unobstructed or impeded which, in turn, effects the resultant emitting image (not shown) sensed by sensor (84).

As grating (80) is driven in the direction of arrow A, those skilled in the art will recognize the proximity of corresponding image (94) to ingressing area (90) creates an interference thereby enhancing the sensitivity of sensor (84) to emitting image (not shown). Very importantly, due to the interference phenomenon, the physical mask required by the prior art is eliminated. Further, preselected length and pitch of gradient index lens reflector (86) will control the rotation of corresponding image (94) relative to the ingressing image as well as the focal plane for corresponding image (94). Therefore, when desired, the focal plane for corresponding image (94) can be engineered to fall proximate to grating (80) rather than precisely on grating (80).

In practicing the present encoder, the ingressing image and corresponding image (94) are always in spatial relation to each other. When grating (80) is driven in the direction of arrow A, the alternating opaque and translucent sections of grating (80) yield interference between the focal planes for ingressing area (90) and corresponding image (94). This interference generates the illusion of corresponding image (94) moving in a direction opposite arrow A. Most importantly, this unexpected discovery has been found to also enhance sensitivity of encoders, within the ambit of the present invention.

Having disclosed the invention as required by Title 35 of the United States Code, Applicant now prays respectfully that Letters Patent be granted for his invention in accordance with the scope of the claims appended hereto.

What is claimed is:

1. An encoder for generating a virtual mask and for sensing an emitting image comprising:

a) a positioner for a grating;

b) a light for illuminating an area of said grating for originating an ingressing image;

c) a gradient index lens aligned with said grating for focusing said ingressing image on a reflector for reflecting and generating a corresponding image proximate to said grating wherein an interaction between said ingressing image and said corresponding image generates said virtual mask;

d) a sensor aligned with said reflector for sensing said emitting image created by said virtual mask and said grating; and e) a driver for moving said positioner.

2. The invention of claim 1 wherein said corresponding image is focused on an end of said gradient index lens.

3. The invention of claim 1 wherein said corresponding image is focused in a plane outside said gradient index lens.

4. The invention of claim 3 wherein said corresponding image is inverted.

5. The invention of claim 4 wherein said light is monochromatic.

6. The invention of claim 5 wherein said reflector is within said gradient index lens.

7. The invention of claim 5 wherein said reflector is aligned with said gradient index lens.

8. The invention of claim 7 wherein said reflector is attached to said gradient index lens.

9. The invention of claim 8 wherein a length of said gradient index lens is no greater than 7 millimeters and wherein a diameter of said gradient index lens is no greater than 2 millimeters.

10. The invention of claim 9 wherein said gradient index lens further comprises a 0.25 pitch.

11. The invention of claim 9 wherein said gradient index lens further comprises a 0.75 pitch.

12. The invention of claim 10 wherein said corresponding image is on said grating.

13. An encoder for generating a first and a second virtual mask and for sensing a first emitting image and a second emitting image, comprising:
   a) a positioner for a grating;
   b) a light for illuminating a first and a second area of said grating for originating a first ingressing image and a second ingressing image;
   c) a gradient index lens aligned with said grating for focusing said first and said second ingressing image on a reflector for reflecting and thereafter generating a first and a second corresponding image proximate to said grating wherein an interaction between said first ingressing image and said first corresponding image generate said first virtual mask and wherein an interaction between said second ingressing image and said second corresponding image generate said second virtual mask;
   d) a first sensor and a second sensor aligned with said reflector for sensing said first emitting image and said second emitting image; and
   e) a driver for moving said positioner.

14. The invention of claim 13 wherein said first and second corresponding images are focused in planes outside said gradient index lens.

15. The invention of claim 14 wherein said first and second corresponding images are inverted.

16. The invention of claim 15 wherein said light is monochromatic.

17. The invention of claim 16 wherein said reflector is aligned with said gradient index lens.

18. The invention of claim 17 wherein said reflector is attached to said gradient index lens.

19. The invention of claim 18 wherein a length of said gradient index lens and said reflector is no greater than 7 millimeters and wherein a diameter of said gradient index lens is no greater than 2 millimeters.

20. The invention of claim 19 wherein said grating is arced.

21. The invention of claim 20 wherein said gradient index lens further comprises a 0.25 pitch.

22. The invention of claim 20 wherein said gradient index lens further comprises a 0.75 pitch.

23. The invention of claim 21 wherein at least one of said first and second corresponding images is on said grating.

24. The invention of claim 23 further comprising a second gradient index lens and a second reflector for focusing said second ingressing image on said second reflector for reflecting and thereafter generating said second corresponding image proximate to said grating.

25. The invention of claim 24 further comprising a second light for illuminating said second area of said grating.

26. An encoder for generating a first and a second virtual mask and for sensing a first emitting image and a second emitting image, comprising:
   a) a positioner for angling a grating;
   b) a light for illuminating a first and a second area of said grating for originating a first ingressing image and a second ingressing image;
   c) a gradient index lens aligned with said grating for focusing said first and said second ingressing image on a reflector for reflecting and thereafter generating a first and a second corresponding image proximate to said grating wherein an interaction between said first ingressing image and said first corresponding image generate said first virtual mask and wherein an interaction between said second ingressing image and said second corresponding image generate said second virtual mask;
   d) a first sensor and a second sensor aligned with said reflector for sensing said first emitting image and said second emitting image; and
   e) a driver for moving said positioner.

27. The invention of claim 26 wherein said first and second corresponding images are focused in planes outside said gradient index lens.

28. The invention of claim 27 wherein said first and second corresponding images are inverted.

29. The invention of claim 28 wherein said light is monochromatic.

30. The invention of claim 29 wherein said reflector is aligned with said gradient index lens.

31. The invention of claim 30 wherein said reflector is attached to said gradient index lens.

32. The invention of claim 31 wherein a length of said gradient index lens and said reflector is no greater than 7 millimeters and wherein a diameter of said gradient index lens is no greater than 2 millimeters.

33. The invention of claim 32 wherein said grating is linear.

34. The invention of claim 33 wherein said gradient index lens further comprises a 0.25 pitch.

35. The invention of claim 33 wherein said gradient index lens further comprises a 0.75 pitch.

36. The invention of claim 34 wherein at least one of said first and second corresponding images is on said grating.

37. The invention of claim 36 further comprising a second gradient index lens and a second reflector for focusing said second ingressing image on said second reflector for reflecting and thereafter generating said second corresponding image proximate to said grating.

38. The invention of claim 37 further comprising a second light for illuminating said second area of said grating.

* * * * *